Patented Mar. 24, 1953

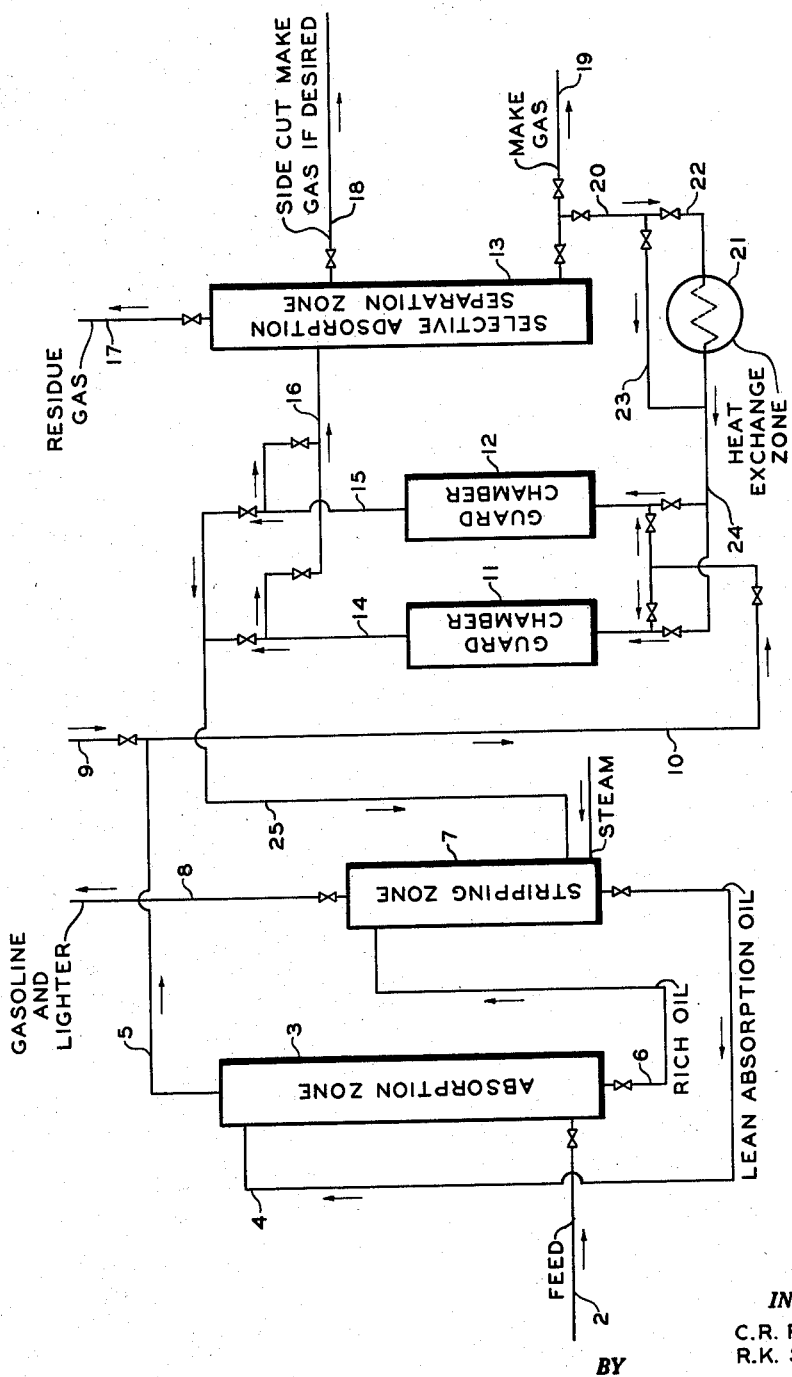

2,632,726

UNITED STATES PATENT OFFICE 2,632,726

METHOD OF GUARDING SELECTIVE ADSORPTION SEPARATION SYSTEMS

Clarence R. Ringham and Russell K. Simms, Bartlesville, Okla., assignors to Phillips Petroleum Company, a corporation of Delaware Application July 22, 1949, Serial No. 106,228

2 Claims. (Cl. 196—8)

This invention relates to the separation of materials. In one of its embodiments it relates to guarding a selective adsorption separation zone so as to prevent materials which are difficult to desorb from selective adsorbents from entering a selective adsorption separation zone. In one of its more specific aspects it relates to a guarding operation for preventing $C_5$ and heavier hydrocarbon materials from entering a selective adsorption separation zone, which is used in conjunction with an oil adsorption zone, to separate and recover $C_2$, $C_3$ and/or $C_4$ hydrocarbons and gasoline from a gaseous mixture comprising $C_1$ to more than $C_5$ hydrocarbons and other low-boiling normally gaseous materials, said oil absorption process utilizing a stripping zone to remove adsorbed hydrocarbons from a rich absorption oil. In still another of its more specific aspects it relates to a method of regenerating selective adsorbents used in the above mentioned guarding operation.

The prior art teaches methods of treating natural and/or refinery gases to separate and recover $C_2$, $C_3$ and/or $C_4$ hydrocarbons and gasoline. A. J. Miller in co-pending application, Serial No. 98,369 filed June 10, 1949, teaches a method of separating and recovering hydrocarbons which is particularly adaptable to treating natural and/or refinery gases available at relatively high pressures of from 400 to 5000 pounds per square inch absolute. In his process Miller uses flash-flood absorption in conjunction with selective adsorption. A. J. Miller and J. L. Groebe in co-pending application, Serial No. 98,368 filed June 10, 1949, teach a method of separating and recovering hydrocarbons, particularly adapted to treating natural and/or refinery gases, which uses absorption in conjunction with selective adsorption. R. D. Bauer in co-pending application, Serial No. 101,611, filed June 27, 1949, teaches a method of treating a natural and/or refinery gas to separate and recover gasoline and low-boiling normally gaseous hydrocarbon materials which uses an absorption process in conjunction with a cyclic fixed-bed selective adsorption separation system. Bauer's process can be advantageously used to treat refinery and/or natural gas available at relatively high pressures without losing pressure on the unrecovered residue gases. All of the above mentioned processes, as will be noted, utilize an absorption process, preferably using a mineral seal oil, to absorb components desired to be recovered from the natural and/or refinery gas feed. Selective adsorption, fixed-bed, cyclic fixed-bed or continuous moving-bed, is used to separate and recover the desired $C_2$ or $C_3$ and/or $C_4$ hydrocarbons. In all of the above mentioned processes the $C_4$ and lower boiling hydrocarbon materials come in contact with the absorbent prior to their passage into the selective adsorption separation zone. The low-boiling hydrocarbons after such contact contain entrained absorbent. Also, absorption and the distillation, flashing, venting, stripping, etc. operations used in conjunction with absorption do not make finite separations between the $C_4$ and lower boiling hydrocarbon materials, other low-boiling materials, and the $C_5$ and higher boiling hydrocarbon materials. As a result, the $C_4$ and lower boiling hydrocarbon materials which are treated in the selective adsorption separation equipment contain entrained absorbent and $C_5$ and higher boiling hydrocarbon materials from the feed. Entrained absorption oil and $C_5$ and higher boiling hydrocarbon materials are very readily absorbed by selective absorbents, such as activated-charcoal, silica gel, bauxite, fuller's earth, etc., effectively poisoning the selective adsorbents and necessitating their regeneration before they can be used to separate and recover the desired $C_4$ and lower boiling hydrocarbon fractions. It is both difficult and expensive to strip the absorption oil and $C_5$ and heavier hydrocarbon materials from the selective adsorbent so as to regenerate it. Any method of preventing absorption oil and $C_5$ and heavier hydrocarbon materials from entering the selective adsorption separation equipment, particularly when a continuous moving-bed activated-charcoal separation system is used, would be a very worthwhile addition to the art. I have invented such a method. In addition, the method of my invention aids in stripping hydrocarbons from absorption oil as will be apparent hereinafter, as well as recovering the contaminating absorption oil and $C_5$ and higher boiling hydrocarbon materials which would normally be lost, if high temperature steam stripping is used to regenerate the selective adsorbents, as has been taught in the prior art.

The guarding operation of our invention can be used in processes for separating and recovering a low-boiling normally gaseous hydrocarbon material from a gaseous hydrocarbon material comprising said low-boiling normally gaseous hydrocarbon material, higher boiling hydrocarbon materials and lower boiling normally gaseous hydrocarbon materials wherein an absorption process is used in conjunction with a selective adsorption separation zone, said absorption process utilizing a stripping zone to remove absorbed hydrocarbons from a rich absorption medium withdrawn from an absorption zone and said selective adsorption separation zone being used to separate and recover said low-boiling normally gaseous hydrocarbon material from a stream comprising said low-boiling normally gaseous hydrocarbon material, lower boiling normally gaseous hydrocarbon material and containing higher boiling hydrocarbon materials. The guarding operation of our invention comprises passing the last mentioned stream, the feed stream to the selective adsorption separation zone, into a bed of a selective adsorbent prior to passing said last mentioned stream into the selective adsorption separation zone. The higher boiling hydrocarbon materials contained in the feed stream are adsorbed on the selective adsorbent thus removing the higher boiling hydrocarbon materials, preventing them from entering the selective adsorption separation ozne. A portion of low-boiling normally gaseous hydrocarbon material, separated and recovered in the selective adsorption separation zone, is passed into a bed of selective adsorbent, used as hereinbefore set forth to adsorb the higher boiling hydrocarbon materials from the feed stream to the selective adsorption separation zone. This low-boiling normally gaseous hydrocarbon material is used to desorb or strip the higher boiling hydrocarbon material from the selective adsorbent used to guard the selective adsorption separation zone. A resulting mixture of low-boiling normally gaseous hydrocarbon material and higher boiling hydrocarbon materials stripped from the adsorbent in the guarding chamber is withdrawn and passed into a stripping zone used as hereinbefore set forth to remove absorbed hydrocarbons from an absorption medium. We find that it is usually desirable to heat the low-boiling normally gaseous hydrocarbon material used as the stripping or desorbing medium in order to get good stripping in the regeneration operation. Also, we find that our method of regeneration has the advantages of recovering the higher boiling hydrocarbon materials which usually consist of absorption medium and gasoline constituents, and the absorption medium stripping operation is aided due to the fact that the higher boiling hydrocarbon materials condense, giving up heat in the stripping zone, and the low-boiling normally gaseous hydrocarbon material provides vapors to aid stripping.

It is an object of this invention to provide a method for the separation of materials.

It is another object of this invention to provide a method for guarding a selective adsorption separation zone so as to prevent materials which are difficult to desorb from selective adsorbents from entering a selective adsorption separation zone.

It is another object of this invention to provide a method for preventing $C_5$ and heavier hydrocarbon materials from entering a selective adsorption separation zone which is used in conjunction with an oil absorption zone to separate and recover $C_2$, $C_3$ and/or $C_4$ hydrocarbons and gasoline from a gaseous mixture comprising $C_1$ to more than $C_5$ hydrocarbons and other low-boiling normally gaseous material, said oil absorption process utilizing a stripping zone to remove absorved hydrocarbons from a rich absorption oil.

It is still another object of this invention to provide a method for regenerating selective adsorbents used in the above mentioned guarding operation.

Other objects and advantages of the process of our invention will become apparent, to one skilled in the art, upon reading this disclosure.

The drawing which accompanies and is a part of this disclosure is a diagrammatic flow sheet setting forth an embodiment of the process of our invention.

The guarding operation of our invention can be used to guard a selective adsorption separation zone which is used in conjunction with an absorption process to separate a low-boiling normally gaseous hydrocarbon material from a mixture containing same in admixture with lower boiling normally gaseous material and higher boiling hydrocarbon material. As hereinbefore set forth, such separation processes are known in the art. These combination processes, utilizing absorption and selective adsorption separation, employ a stripping operation to remove absorbed materials from a rich absorption medium withdrawn from an absorption zone. The process of our invention is particularly adaptable to separation processes wherein natural or refinery gas is treated by a process utilizing oil absorption in conjunction with selective adsorption separation, the oil absorption process being used to first treat the natural or refinery gas, defined as a gaseous mixture comprised of $C_1$ to more than $C_5$ hydrocarbons and other low-boiling normally gaseous materials, and the selective adsorption separation step being used to separate and recover low-boiling normally gaseous hydrocarbon materials, such as $C_2$, $C_3$ and/or $C_4$ hydrocarbons. If the gaseous mixture being treated is a natural gas, it will normally be comprised of saturated hydrocarbons while, if it is a refinery gas, it normally will be comprised of both saturated and unsaturated hydrocarbons. Natural gas treated will usually be comprised of a large amount of methane, a smaller amount of ethane, propane, butanes, pentanes and hexanes, and minor quantities of heptanes and octanes, together with nitrogen, carbon dioxide, hydrogen sulfide and mercaptans as impurities or contaminants. Refinery vapors can be treated and they normally will be comprised of hydrogen, methane, $C_2$'s, $C_3$'s, $C_4$'s, $C_5$'s and a minor quantity of $C_6$'s. Plant vapors, such as flash tank vapors or a composite stream from a vapor recovery system or from gasoline or crude storage tanks, can be treated. In treating all of the above mentioned streams the gaseous feed mixture usually comes in contact with the liquid absorption medium, preferably a mineral seal oil, and the low-boiling normally gaseous hydrocarbon materials which are separated and recovered in the selective adsorption separation zone pick-up absorption oil which will effectively poison selective adsorbents. Their removal so as to regenerate the selective adsorbents is difficult and expensive. $C_5$'s and higher boiling hydrocarbons are also usually present in the feed to the selective adsorption separation zone. These are readily adsorbed by selective adsorbents and are difficult and expensive to remove so as to regenerate the selective adsorbent.

Referring now to the drawing, the following discussion is directed to the use of the guarding operation of our invention as applied to the treating of a gaseous mixture comprising $C_1$ to more than $C_5$ hydrocarbons and other low-boiling normally gaseous materials. It is to be understood that the following discussion is not to unduly limit the scope of our invention. The gaseous feed mixture is passed via line 2 into absorption zone 3 wherein the gaseous feed mixture is countercurrently and directly contacted with lean absorption oil passed into absorption zone 3 via line 4. Unabsorbed low-boiling normally gaseous hydrocarbon materials and other low-boiling normally gaseous materials are withdrawn overhead from absorption zone 3 via line 5. For instance, this stream is normally comprised of $C_4$ and lower boiling hydrocarbon materials and other low-boiling normally gaseous materials and contains entrained absorption oil and frequently some $C_5$ and higher boiling hydrocarbon materials. Rich absorption oil containing $C_5$ and higher boiling hydrocarbon material and some $C_4$'s and $C_3$'s with minor amounts of $C_2$'s and methane is withdrawn from absorption zone 3 via line 6 and is passed into stripping zone 7 wherein the absorbed hydrocarbons are stripped from the absorption oil. Lean absorption oil is withdrawn from stripping zone 7 to be recycled to absorption zone 3 via line 4. The hydrocarbon materials stripped from the rich absorption oil in stripping zone 7 are withdrawn from stripping zone 7 via line 8. These hydrocarbon materials comprise gasoline constituents absorbed in absorption zone 3 and some $C_3$'s and $C_4$'s and lighter. In equipment not shown on the drawing this stream from stripping zone 7 is at least partially condensed and the uncondensed vapors comprising $C_3$'s and lighter are returned via line 9. The raw condensed gasoline can be stabilized by removing the $C_3$'s and some of the $C_4$'s in equipment not shown. The resulting removed $C_3$'s and $C_4$'s can also be introduced into line 5 via line 9. The resulting $C_3$'s and $C_4$'s frequently contain some $C_5$ and higher boiling hydrocarbon materials. The hydrocarbon materials withdrawn from absorption zone 3 via line 5 and those introduced into line 5 via line 9 are passed via line 10 into either guard chamber 11 or guard chamber 12, depending upon which guard chamber is on the absorption cycle. The diagrammatic drawing as set forth depicts a cyclic operation in which one guard chamber is being regenerated while the other is on cycle to adsorb $C_5$ and higher boiling hydrocarbon materials so as to prevent them from entering selective adsorption separation zone 13. The guarding chambers as depicted contain fixed beds of a selective absorbent such as activated-charcoal, silica gel, bauxite, fuller's earth, etc., preferably activated-charcoal. We find that it is preferable that the selective adsorbent have a particle size of from 5 to 60 mesh. However, any size particle can be used which is not too small to plug up the bed or which is not too large to greatly lower the adsorptive capacity. The $C_5$ and higher boiling hydrocarbon materials carried over from the feed and entrained absorption oil is removed from the feed stream to selective adsorption separation zone 13 by adsorbing them on the selective adsorbent in the guard chamber. The guard chamber is kept on stream until $C_5$ and higher boiling hydrocarbon materials appear in the gas stream withdrawn via line 14 and 15, depending on which guard chamber is on the adsorption cycle. The $C_4$ and lower boiling hydrocarbon stream, free of $C_5$ and higher boiling hydrocarbon materials is passed into selective adsorption separation zone 13 via line 16 wherein it is separated into the desired fractions to be recovered. For instance, a stream comprised of methane and lighter can be produced and withdrawn via line 17, a $C_2$ stream can be produced and withdrawn via line 18 and a $C_3$ and $C_4$ stream can be produced and withdrawn via line 19, or a cut can be made between $C_2$ and $C_3$ hydrocarbons, producing a $C_2$ and lighter hydrocarbon stream and a $C_3$ and heavier hydrocarbon stream, or, if desired, a $C_4$ stream can be produced and withdrawn via line 19. Selective adsorption separation zone 13 can be any suitable selective adsorption separation system, such as a fixed-bed system, a cyclic fixed-bed system, such as the system disclosed by R. D. Bauer in copending application, Serial No. 101,611, filed June 27, 1949, or a continuous moving-bed activated-charcoal selective adsorption separation system.

As the feed gas stream to selective adsorption separation zone 13 is passed through the guard chamber which is on the adsorption cycle, the selective adsorbent contained therein will gradually become saturated with $C_5$ and higher boiling hydrocarbon materials. Once the selective adsorbent is saturated with $C_5$ and higher boiling hydrocarbon materials, it will no longer remove $C_5$ and higher boiling hydrocarbon materials from the gas stream, necessitating regenerating the selective adsorbent. When the saturation point has been reached the guard chamber is removed from the adsorption cycle by switching the feed gas stream to the other guard chamber. The regeneration of the selective adsorbent, saturated with $C_5$ and higher boiling hydrocarbon material, is carried on by withdrawing a portion of one of the product streams produced by selective adsorption separation zone 13, preferably the bottoms make gas which will usually be a $C_4$ stream or a $C_3$ and $C_4$ stream. A portion of the bottom make gas stream is withdrawn from line 19 via line 20 and is passed into indirect heat exchange zone 21 via line 22. If desired, all or a portion of the make gas to be used for regenerating can be by-passed around heat exchange zone 21 via line 23, that is if the regeneration gas is at a high enough temperature to regenerate the selective adsorbent. However, we find that it is usually necessary to add heat to the regeneration gas in heat exchange zone 21. The hot regeneration gas is passed into the guard chamber to be regenerated via line 24. The hot regenerating gas desorbs or strips the $C_5$'s and higher boiling hydrocarbon materials from the selective adsorbent. A mixture of the regeneration gas and the stripped $C_5$ and higher boiling hydrocarbon materials is withdrawn from the guard chamber via line 14 or 15, depending upon which guard chamber is on the regeneration cycle, and is passed via line 25 into stripping zone 7, preferably into the liquid phase of rich absorption oil in the lower portion of stripping zone 7. We find that this introduction of regeneration gas containing the stripped $C_5$ and higher boiling hydrocarbon materials aids the stripping operation by providing heat and low-boiling hydrocarbon vapors.

The lean absorption oil passed to absorption zone 3 usually has a molecular weight in the range of from 100 to 250 with less than 200 being preferred. A typical mineral seal oil will boil within the range of from 400 to 600° F. However, in systems wherein it is possible to cool the feed gas to absorption zone 3 and the lean absorption oil to a temperature in the range of from 40 to 60° F., a lighter and lower boiling lean absorption oil may be used advantageously.

Such an oil might comprise a heavy gasoline or naphtha fraction boiling within the range of from 200 to 400° F. In any case the lean absorption oil employed will, if carried along in the feed to selective adsorption systems. The gas stream inate and effectively poison selective adsorbents, necessitating expensive regeneration and difficult problems of handling in continuous moving-bed selective absorption systems. The gas stream passing overhead from absorption zone 3 is unavoidably contaminated with a minor amount of the absorption oil. The degree of contamination usually falls within the range of from 0.05 weight per cent to about 0.25 weight per cent. We find that this contaminant can be effectively adsorbed from the gas by the selective adsorbent in guarding chambers 11 and 12. The guard chamber also reduces or eliminates the quantity of $C_5$ and higher boiling hydrocarbon materials which is usually present in the gas stream, particularly in the event that flash tank, vent tank and other uncondensed vapor streams are admixed with the gas stream from absorption zone 3. Known continuous moving-bed activated-charcoal selective adsorption separation systems can economically tolerate as much as 0.2 mol per cent $C_5$ and higher boiling hydrocarbon materials. Due to this fact we find that our guard chambers can be kept on stream on the adsorption cycle for a relatively long period of time, that is, until the selective adsorption separation zone feed gases withdrawn from the guard chamber contain about 0.2 mol per cent of $C_5$ and higher boiling hydrocarbon materials. Absorption oil is much more difficult and expensive to strip from selective adsorbents than are the $C_5$ and higher boiling hydrocarbon materials carried over from absorption zone 3.

The above discussion and the accompanying drawing will serve as examples of the guarding operation of our invention. However, the scope of the guarding operation of our invention is not to be unduly limited by such above discussion and accompanying drawing.

As will be evident to those skilled in the art, various modifications of this invention can be made, or followed, in the light of this disclosure and discussion, without departing from the spirit or scope of the disclosure or from the scope of the claims.

We claim:

1. A process for treating a gaseous mixture comprising $C_1$ to more than $C_5$ hydrocarbons and other low-boiling normally gaseous materials comprising passing said mixture to an oil absorption zone; recovering and passing a rich oil stream containing $C_5$ and higher boiling hydrocarbons from said adsorption zone to a stripping zone; passing stripping gas to the lower portion of said stripping zone; recovering stripped $C_5$ and higher boiling hydrocarbons from said stripping zone; passing stripped absorption oil from the lower portion of said stripping zone to said absorption zone; passing gaseous effluent from said absorption zone to a first guard zone containing a fixed bed of solid adsorbent wherein any unabsorbed $C_5$ and higher boiling hydrocarbons are adsorbed; passing unadsorbed $C_4$ and lower boiling hydrocarbons from said guard zone to a selective adsorption separation zone wherein higher boiling said hydrocarbons are separated from lower boiling said hydrocarbons; recovering said separated hydrocarbons; passing a heated portion of the higher boiling hydrocarbons recovered from said selective adsorption separation zone to a second guard zone containing a fixed bed of solid adsorbent and desorbing $C_5$ and higher boiling hydrocarbons adsorbed therein; passing gaseous effluent from said second guard zone to said stripping zone; and transferring said gaseous effluent from said adsorption zone to the said second guard zone and said heated portion of the higher boiling hydrocarbons recovered from said selective adsorption separation zone to said first guard zone when said first guard zone becomes substantially saturated with $C_5$ and higher boiling hydrocarbons.

2. The process of claim 1 in which said higher boiling hydrocarbons passed to said second guard zone are passed through an indirect heat exchange zone before being passed to said guard zone.

CLARENCE R. RINGHAM.
RUSSELL K. SIMMS.

REFERENCES CITED

The following references are of record in the file of this patent:

UNITED STATES PATENTS

| Number | Name | Date |
|---|---|---|
| 1,422,007 | Soddy | July 4, 1922 |
| 1,496,061 | Loomis | June 3, 1924 |
| 2,354,383 | Kiesskalt | July 25, 1944 |
| 2,376,425 | Frey | May 22, 1945 |

OTHER REFERENCES

Berg. "Trans. Am. Inst. of Chemical Engineers," vol. 42, pages 665–680 (1946).

Thornton, "Petroleum Processing," vol. 3, pages 1052–54, Nov. 1948.